Figure 1:
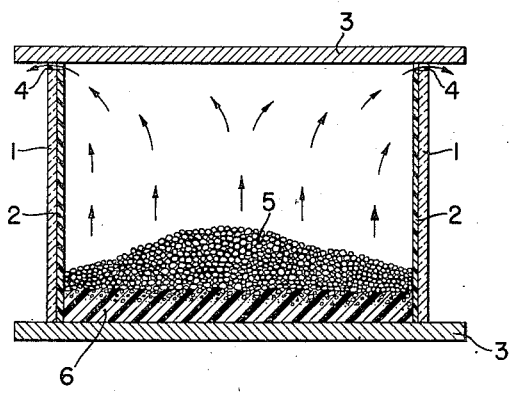

Oct. 5, 1954    F. A. JEFFRIES ET AL    2,690,987
RESIN FOAMED STRUCTURES AND THE METHOD OF MAKING SAME
Filed March 22, 1951

INVENTOR.
FRANK A. JEFFRIES
BY  WILLIAM H. TAYLOR

*R. L. Miller*
ATTORNEY

Patented Oct. 5, 1954

2,690,987

UNITED STATES PATENT OFFICE 2,690,987

RESIN FOAMED STRUCTURES AND THE METHOD OF MAKING SAME

Frank A. Jeffries, Cuyahoga Falls, and William H. Taylor, Akron, Ohio, assignors, by mesne assignments, to The Goodyear Tire & Rubber Company, a corporation of Ohio Application March 22, 1951, Serial No. 217,055

8 Claims. (Cl. 154—140)

1

This invention relates to a method of making a laminated structure, and to the structure so prepared. More particularly, this invention relates to an improved method of foaming the interior portion of a laminated structure and to the structure so prepared.

In the field of manufacturing laminated structures by interiorly foaming a material in place between two or more wall surfaces, it is difficult to secure uniformity of gellation and uniformity of foam in the finished structure. In many structures so prepared, large bubbles at the adhesion surfaces between the foam and structure walls create a weakened product.

Tensile strength which resists lateral deflection of the structure walls has been of particular concern in the fabrication of many laminated, interiorly foamed structures such as radar canopies, guided missile parts and aircraft parts. It has been difficult to obtain the desired structural strength in these products by foaming in place because of the creation of planes of weakness parallel to and slightly removed from the structure walls. Failure is not a matter of failure of adhesion between the foam and the structure walls but, rather, such foamed structures universally fracture within the interior of the foam along a discernible plane near the walls.

This phenomenon is not completely understood, but it is believed due to a shearing action created within the foam during gas evolution and simultaneous rise of the foam. It may be that the shearing action is caused by a partial restraint at the adhesion surface by a more rapid gellation at that point. Thus, as the foam rises, the surface being substantially retained, a shearing action between the main body and the retained portion results.

Various lubricants such as glycerine, lubricating oils and the like have been used on the inner surfaces of the walls in an effort to create a more uniform rise of the foam during the foaming operation. These lubricants have failed to bring about the desired result, either because the rise of the foam is not made more uniform or because the point of adhesion between the foam and structure wall is weakened.

It is an object of this invention to create a uniformly foamed laminated foam structure.

It is another object of this invention to provide a process for foaming in place which will not create a weak plane in the foam parallel to and slightly removed from the wall surface.

In the practice of this invention, structure walls can be prepared by any of the customary

2 methods, e. g., by laminating fiber glass, cellulose or other fibrous products or from wood, steel or other sheeted products. These walls may be in the form of unitary planes or may be shaped to any contour desired. Two or more such walls can be laminated together by foaming a resinous cellular material therebetween.

The cellular interior can be foamed from any type of gas-liberating resinous material. In the practice of this invention, a mixture of alkyd resin, having an acid number of about 35 to 50, and diisocyanate is preferred. During the foaming step, the structure walls are rigidly retained in position by means of molds. These molds, while preferably substantially tight, have capillary vent holes in the top which liberate the air which is displaced by the expanding foam. Since these vents are substantially impassable to the foam, restraint is exerted by the mold when the cavity is filled.

This invention is concerned with a means of aiding the free rise of the foam during the gas evolution step. In preparing the structure walls, the inner face, which is to be in contact with the foamed interior, is coated with a substantially non-foaming resin mixture similar in chemical composition to the foaming mixture used. This tends to lubricate the wall and allow a free rise of the foam. Also, the compatibility of the two mixtures, consequent on their similarity of constitution, creates a strong bond, tending to eliminate the weak plane usually occurring in such foamed interiors adjacent the retaining walls.

Any low acid number alkyd resin-diisocyanate mixture can be used as a coating composition in the practice of the invention, especially an alkyd resin having an acid number of 0 to 10. However, it is preferable to keep the acid number below 5. The low acid number is necessary in order to limit the carboxyl groups which could react with the NCO of the diisocyanate to generate $CO_2$ and thus create a foaming material which is inoperable as a lubricant.

The following examples are given by way of illustration and are not intended as limitations on the invention.

Example 1

Flat fiber glass skins were made by curing sheets of fiber glass with a commercial alkyd resin known as Selectron 5003, marketed by the Pittsburgh Plate Glass Company. This curing was completed within a polyvinyl alcohol bag and under reduced pressure. These skins were used to form the walls of interiorly foamed structures illustrated in this and the following examples. A coating composition was prepared as follows:

| | Parts by weight |
|---|---|
| Alkyd resin (acid number—1 to 2) | 50.0 |
| Glycerine—3 moles | |
| Adipic acid—2 moles | |
| Tolylene di-isocyanate | 30.2 |
| Methyl ethyl ketone | 20.0 |

The mixture was allowed to stand for 40 minutes with occasional stirring.

This material was then used to coat a surface of each of two previously prepared skins. A test panel was then constructed by foaming a resin composition between the two surfaces, the entire assembly being rigidly retained by an aluminum mold open only by vents to allow the escape of trapped air.

The foaming composition was prepared as follows:

| | Parts by weight |
|---|---|
| Alkyd resin | 250 |
| Glycerine—7.6 moles | |
| Adipic acid—5.0 moles | |
| Phthalic anhydride—1 mole | |
| Tolylene di-isocyanate | 254 |
| Water | 0.5 |

The alkyd resin was prepared by reacting the indicated materials until an acid number of 35 was reached. Reaction was then stopped by cooling the mixture. The resin was then mixed with the di-isocyanate and water.

This foaming material was used to interiorly foam a test panel, the inner walls of which had been coated with the non-foaming resin material shown above. The same foaming material was also used to interiorly foam a test panel, the inner sides of which had not been coated. Both panels were cured one hour at 150° F. under reduced pressure and two hours at 220° F. at atmospheric pressure.

Tensile tests indicated that the panel prepared with the inner surfaces coated with the non-foaming alkyd resin material had a tensile strength of 230 pounds per square inch measured normal to the faces and failed in a non-uniform pattern, while the panel prepared without a surface coating on the walls had a tensile strength of only 80 pounds per square inch measured normal to the faces and failed along a definite plane of weakness parallel to and slightly removed from the confining skin surfaces.

*Example 2*

Fiber glass skins, a coating composition, and a foaming mixture, were prepared as in Example 1. The coating composition was allowed to set for five hours, after which it was used to coat the surfaces of the skins which would be adjacent the foam. Foaming and curing were then completed as in Example 1. This panel gave a tensile strength of 250 pounds per square inch when measured as in the preceding example.

*Example 3*

A test panel was prepared as in Example 1. Curing of the panel was conducted for one hour at 150° F. and then for two hours at 240° F. Tensile strength measured normal to the faces was 250 pounds per square inch and the failure was not uniform.

A standard panel was prepared under the same conditions as shown above except that the skin surfaces were not coated. This panel gave a tensile strength, measured normal to the faces, of only 30 pounds per square inch and had a definite plane of failure parallel to and slightly removed from the faces.

Other examples of operable alkyd resins are resins resulting from the condensation of such polycarboxylic acids as phthalic, isophthalic, terephthalic, succinic, adipic, sebacic, maleic, fumaric, itaconic, malic, citric, and such polyhydric alcohols as ethylene glycol, hexamethylene glycol, pinacol, diethylene glycol and glycerol. Other operable isocyanates are such polyisocyanates as methylene diisocyanate, ethylene diisocyanate, 1,2,3,4-tetraisocyanto butane, and P,P',P'' triphenyl methane triisocyanate.

Figure 2:
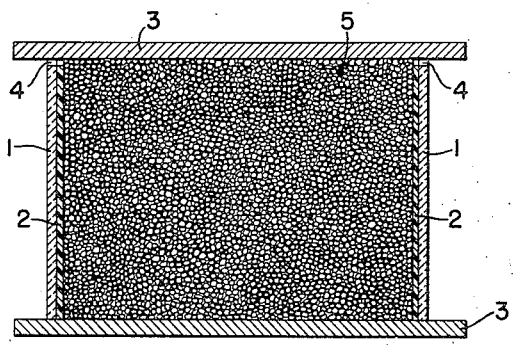

This invention is further illustrated by reference to the accompanying drawing wherein Fig. 1 represents a vertical section of a panel during the foaming operation, and Fig. 2 is a vertical section of a similar panel after completion of the gas evolution.

In the drawing, laminated fiber glass panels 1 are coated with an alkyd resin composition 2 which has a low acid number and is substantially nonfoaming. Any type of structure wherein a resin can be interfoamed can be used in the practice of the invention. However, for the purpose of simplicity of illustration, the drawing shows only the section of a panel having rectilinear cross-sectional area. Limiting bases 3 are clamped over the ends of the rectilinear sections in such a way that confined air is allowed to escape through vents 4 until the foam 5 rises to the top and closes the vents thus imposing a restraint on the foam during the final portion of the foaming operation. Thus the efficacy of this invention is graphically illustrated by showing the advantage of having a wall lubricant which is compatible with the foamable system 6 and the foam 5 in order to minimize the shearing action which is present when a foamable system is foamed within a confined space without the benefit of a compatible wall lubricant.

While certain representative embodiments and details have been shown for the purpose of illustrating this invention, it will be apparent to those skilled in this art that various changes and modifications may be made therein without departing from the spirit or scope of the invention.

We claim:

1. A method of fabricating a laminated structure comprising a foamed interior confined by structure walls which comprises coating at least the interior faces of said walls with a substantially non-foaming composition compatible with the foamable material of which said foamed interior is to be formed, placing said foamable material between said structure walls, causing said material to foam until the space between said walls is substantially filled and then causing said coating and said foam to set.

2. A method of fabricating a laminated structure comprising a foamed resin interior confined by walls constituting surfaces of the structure which comprises coating at least the interior faces of said walls with a substantially non-foaming mixture of alkyd resin and diisocyanate compatible with the alkyd resin-diisocyanate material of which said foamed interior is to be formed, placing said foamable alkyd resin-diisocyanate material between said structure walls, causing said foamable alkyd resin-diisocyanate material to foam until the space between said walls is substantially filled and then causing said alkyd resin-diisocyanate coating material and said alkyd resin-diisocyanate foam to set.

3. The method of making a laminated structure comprising the steps of (1) coating shaped structure walls with a substantially non-foaming mixture of alkyd resin having an acid number less than 10 and diisocyanate, and (2) completing said laminated structure by adhesively joining said walls by foaming a gas-liberating mixture of alkyd resin having an acid number more than 35 and diisocyanate therebetween.

4. The method of making a laminated structure comprising the steps of (1) coating shaped structure walls with a substantially non-foaming mixture of alkyd resin and diisocyanate, said resin having an acid number of 0 to 10 and (2) completing said laminated structure by adhesively joining said walls by foaming a gas-liberating mixture of alkyd resin and diisocyanate therebetween, said resin having an acid number of 35 to 50.

5. A laminated interfoamed structure comprising preshaped structure walls coated on the interior sides with a low acid number alkyd resin diisocyanate mixture, and separated by and adhesively joined by a high acid number alkyd resin diisocyanate foam.

6. In the method of fabricating laminated interfoamed structures without a plane of weakness in the foamed interior adjacent to but slightly removed from the structure walls wherein a foamable substance is foamed in place between at least two confining structure walls, the steps of (1) coating the interior faces of said structure walls with a substantially non-foaming low acid number alkyd resin-diisocyanate material, and (2) completing said laminated structure by foaming said foamable substance which comprises a high acid number alkyd resin-diisocyanate material between the structure walls.

7. A method of fabricating laminated interfoamed structures without a plane of weakness in the foamed interior adjacent to but slightly removed from the structure walls comprising the steps of coating the interior faces of the structure walls with a diisocyanate-modified alkyd resin having an acid number of 0 to 10 and then foaming a diisocyanate-modified alkyd resin having an acid number of 35 to 50 between the structure walls by the application of heat in order to complete the interfoamed laminated structure.

8. A laminated interfoamed structure comprising at least two structure walls, said structure walls having the interior sides thereof coated with a substantially nonfoaming alkyd resin diisocyanate mixture wherein the alkyd resin has an acid number of 0 to 10, and separated by and adhesively joined by a compatible alkyd resin diisocyanate foam wherein the alkyd resin has an acid number of 35 to 50.

References Cited in the file of this patent

UNITED STATES PATENTS

| Number | Name | Date |
| --- | --- | --- |
| 2,376,653 | Boyer | May 22, 1945 |
| 2,503,209 | Nyquist et al. | Apr. 4, 1950 |
| 2,529,512 | Ott | Nov. 14, 1950 |
| 2,576,073 | Kropa et al. | Nov. 20, 1951 |
| 2,591,884 | Simon et al. | Apr. 8, 1952 |
| 2,602,783 | Simon et al. | July 8, 1952 |
| 2,639,252 | Simon et al. | May 19, 1953 |

OTHER REFERENCES

Monsanto "Isocyanate - Based Adhesives," March 16, 1950, pages 3 and 4.

German Plastics Practice 1946 pages 464, 472 and 473.